UNITED STATES PATENT OFFICE.

HERSCHEL C. PARKER AND WALTER G. CLARK, OF NEW YORK, N. Y., ASSIGNORS TO PARKER-CLARK ELECTRIC COMPANY, OF NEW YORK, N. Y., A CORPORATION OF NEW JERSEY.

FILAMENT OR RESISTOR FOR HEATING UNITS OR LAMPS.

976,207. Specification of Letters Patent. Patented Nov. 22, 1910.

No Drawing. Application filed May 20, 1909. Serial No. 497,313.

*To all whom it may concern:*

Be it known that we, HERSCHEL C. PARKER, of the city of New York, county of Kings, and State of New York, and WALTER G. CLARK, of the city, county, and State of New York, have invented a new and useful Improvement in Filaments or Resistors for Heating Units or Lamps, of which the following is a full, clear, and exact description.

Our invention relates to improvements in resistors which can be used as heating units for electrical heaters, or which can be used for incandescent electric lamps.

The object of our invention is to produce a strong, rigid, high resistance conductor which will withstand vibration and which is made up of a low silicon carbid in a combination which we believe to be new and which will be hereinafter described, so that the resistor is capable of withstanding a high temperature, that is temperature of high resistance, in the open air.

It is also an object of our invention to produce a resistor having a high specific resistance, but capable of conducting electricity when cold.

To produce the resistor we take a mixture of approximately two per cent. olefiant gas and the remainder or ninety-eight per cent. hydrogen. This is passed over a proper vaporizer containing silicon tetra-chlorid and into a flashing jar. This may be run up to atmospheric pressure or above, and the flashing carried out in the usual manner, or better results are obtained by working slightly above atmospheric pressure and allowing the gas to flow through the receiver. The filament, which is preferably of carbon, is mounted in the flashing jar precisely as is usual in flashing filaments, and the mixed gases of hydrogen and olefiant, together with the vapor of the silicon-tetra-chlorid, is admitted to the flashing jar, and the heat of the current passing through the filament causes the decomposition of the gases and the deposition of $SiC_2$ on the heated filament. This process may be continued so that any size resistor may be obtained, that is the building up process can be carried forward to any desired point. When the current is turned on through the filament and the gases are decomposed to build up the filament by deposition, the reaction is essentially as follows. $C_2H_4 + SiCl_4$ (and hydrogen in excess) $= SiC_2 + 4HCl$ (and hydrogen in excess). In other words, we produce a silicon di-carbid, that is $SiC_2$. This composition will vary slightly owing in respect to the ratio of carbon to silicon according to the conditions under which the filament is made, such as composition of gases, temperatures, pressure, etc. This compound might be defined as a solution of carbon in carborundum SiC, but is one in which the ratio of carbon to silicon is always greater than one atom of carbon to one atom of silicon. It has a very high specific resistance but still contains enough carbon to carry a current when cold. It is more often silicon di-carbid but the carbon content may be a little more or less than two atoms of carbon to one of silicon.

It is not necessary to limit the process to the use of olefiant gas, as other gases can be used although they are not so easily controlled. For instance we find that instead of olefiant gas we can use marsh gas, acetylene, benzol, the vapors of acetic aldehyde, or sulfuric ether. The reaction which takes place is as follows. The carbon is given up to the silicon, forming $SiC_2$; the chlorin thus freed unites with the hydrogen present, forming HCl. The products after the reaction are $SiC_2$, HCl and H.

We are aware that a silicon carbid has heretofore been produced, viz.—the well known carborundum, SiC and also that silicon and carbon have been united mechanically in many ways, but so far as we have been able to learn no one has ever produced a silicon di-carbid and a resistor or filament which will withstand a temperature of high incandescence in the open air for a long period of time. The filament which we have thus described has been shown many times in public exhibitions and used practically. It is thoroughly standardized, and the process given above will invariably produce it. The filament is a large stiff filament of silicon-dicarbid.

Having thus fully described our invention, we claim as new and desire to secure by Letters Patent:—

1. As an improved article of manufacture, a filament composed essentially of silicon di-carbid.

2. A non-metallic filament which when cold is a conductor of electricity throughout its mass and which will glow continuously at incandescence in the open air upon the passage of an electric current through it.

3. As an improved article of manufacture, a resistor in filament form consisting of a core or base with a non-metallic coating thereon, the whole when cold being a conductor of electricity throughout its mass and which will glow continuously in the open air at a temperature of incandescence.

4. A non-metallic filament or resistor which when cold permits the passage of an electric current throughout its mass, and which under current resistance maintains continuously in the open air a temperature about 1500 degrees C.

5. A non-metallic resistor in which the whole body is a conductor of electricity when cold and which glows at high incandescence in the open air on the passage of an electric current through it.

6. A non-metallic resistor comprising a homogeneous structure or body, which is a conductor of electricity when cold and all the parts of which are of essentially the same conductivity and which glows continuously at high incandescence in the open air upon the passage of an electric current through it.

7. An improved article of manufacture, a resistor in filament form composed of a solution of carbon in carborundum in which the ratio of carbon and silicon is always greater than one atom of carbon to one atom of silicon.

HERSCHEL C. PARKER.
WALTER G. CLARK.

Witnesses:
WARREN B. HUTCHINSON,
FRANK L. STUBBS.

---

Correction in Letters Patent No. 976,207.

It is hereby certified that in Letters Patent No. 976,207, granted November 22, 1910, upon the application of Herschel C. Parker and Walter G. Clark, of New York, N. Y., for an improvement in "Filaments or Resistors for Heating Units or Lamps," an error appears in the printed specification requiring correction as follows: Page 2, line 18, the word "about" should read *above;* and that the said Letters Patent should be read with this correction therein that the same may conform to the record of the case in the Patent Office.

Signed and sealed this 10th day of January, A. D., 1911.

[SEAL.]

C. C. BILLINGS,
*Acting Commissioner of Patents.*

2. A non-metallic filament which when cold is a conductor of electricity throughout its mass and which will glow continuously at incandescence in the open air upon the passage of an electric current through it.

3. As an improved article of manufacture, a resistor in filament form consisting of a core or base with a non-metallic coating thereon, the whole when cold being a conductor of electricity throughout its mass and which will glow continuously in the open air at a temperature of incandescence.

4. A non-metallic filament or resistor which when cold permits the passage of an electric current throughout its mass, and which under current resistance maintains continuously in the open air a temperature about 1500 degrees C.

5. A non-metallic resistor in which the whole body is a conductor of electricity when cold and which glows at high incandescence in the open air on the passage of an electric current through it.

6. A non-metallic resistor comprising a homogeneous structure or body, which is a conductor of electricity when cold and all the parts of which are of essentially the same conductivity and which glows continuously at high incandescence in the open air upon the passage of an electric current through it.

7. An improved article of manufacture, a resistor in filament form composed of a solution of carbon in carborundum in which the ratio of carbon and silicon is always greater than one atom of carbon to one atom of silicon.

HERSCHEL C. PARKER.
WALTER G. CLARK.

Witnesses:
WARREN B. HUTCHINSON,
FRANK L. STUBBS.

---

Correction in Letters Patent No. 976,207.

It is hereby certified that in Letters Patent No. 976,207, granted November 22, 1910, upon the application of Herschel C. Parker and Walter G. Clark, of New York, N. Y., for an improvement in "Filaments or Resistors for Heating Units or Lamps," an error appears in the printed specification requiring correction as follows: Page 2, line 18, the word "about" should read *above;* and that the said Letters Patent should be read with this correction therein that the same may conform to the record of the case in the Patent Office.

Signed and sealed this 10th day of January, A. D., 1911.

[SEAL.]

C. C. BILLINGS,
*Acting Commissioner of Patents.*

It is hereby certified that in Letters Patent No. 976,207, granted November 22, 1910, upon the application of Herschel C. Parker and Walter G. Clark, of New York, N. Y., for an improvement in "Filaments or Resistors for Heating Units or Lamps," an error appears in the printed specification requiring correction as follows: Page 2, line 18, the word "about" should read *above*; and that the said Letters Patent should be read with this correction therein that the same may conform to the record of the case in the Patent Office.

Signed and sealed this 10th day of January, A. D., 1911.

[SEAL.]

C. C. BILLINGS,

*Acting Commissioner of Patents.*